March 29, 1966 D. A. CERMENARO ETAL 3,242,579
BALL JOINT GAGE FOR FRONT END WHEEL SUSPENSIONS
Filed May 15, 1964 2 Sheets-Sheet 1
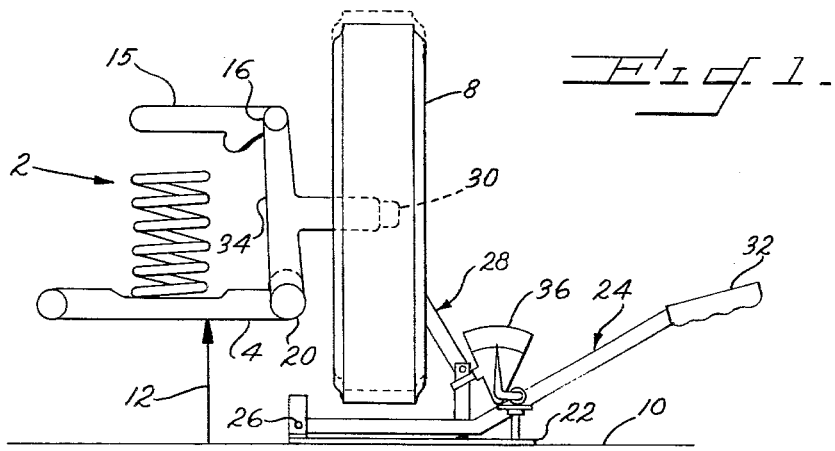
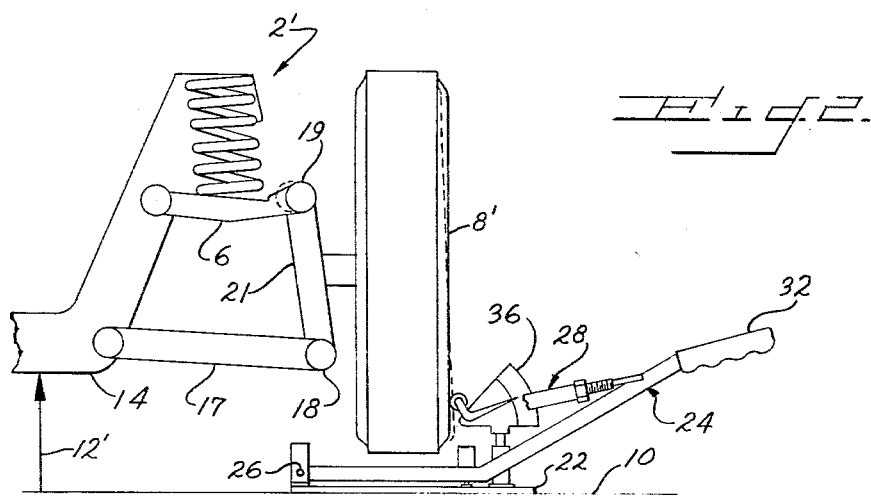
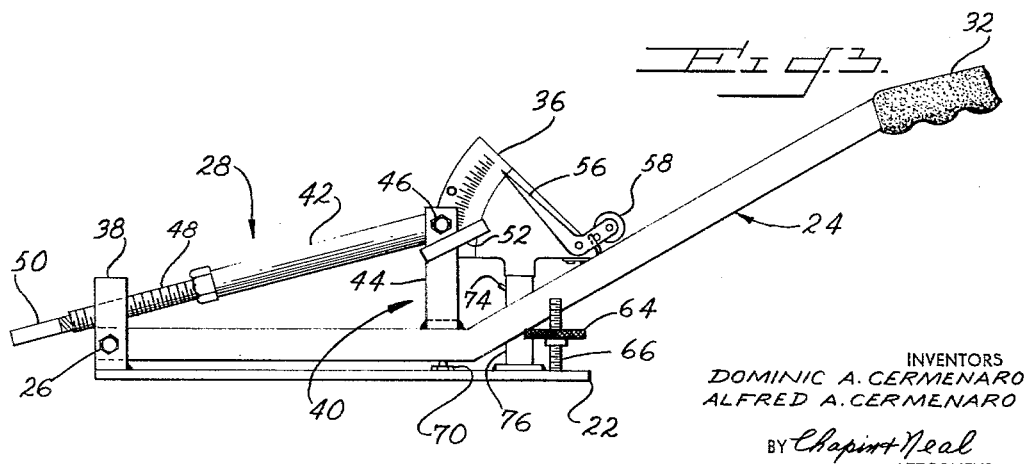
INVENTORS
DOMINIC A. CERMENARO
ALFRED A. CERMENARO
BY Chapin + Neal
ATTORNEYS

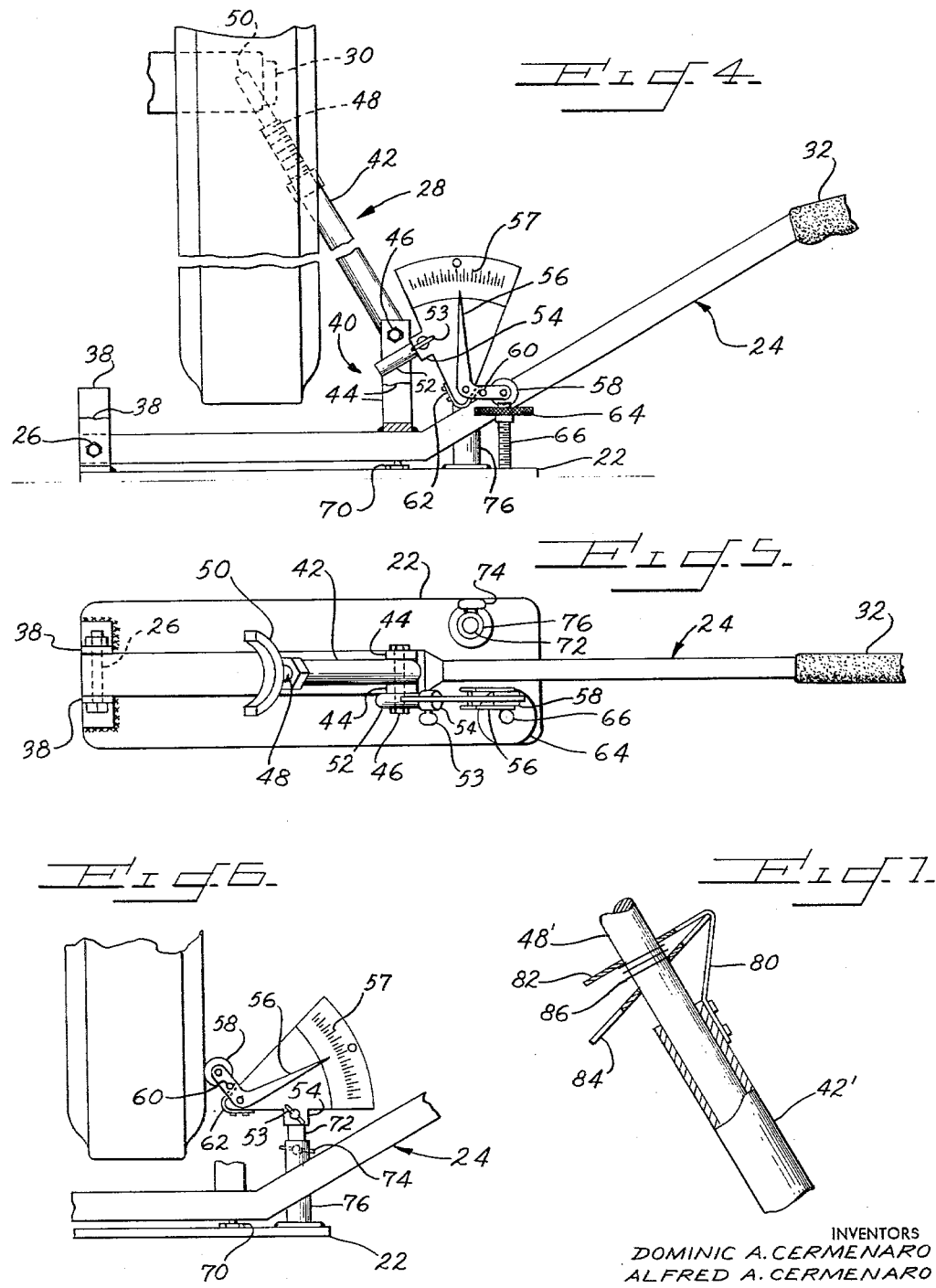

United States Patent Office 3,242,579
Patented Mar. 29, 1966

3,242,579
BALL JOINT GAGE FOR FRONT END WHEEL
SUSPENSIONS
Dominic A. Cermenaro, 22 State Road, and Alfred A. Cermenaro, 56 Olds St., both of North Adams, Mass.
Filed May 15, 1964, Ser. No. 367,693
6 Claims. (Cl. 33—169)

This invention relates to an automobile wheel gage tool and more specifically to a tool or device for detecting and measuring the amount of looseness and play in ball joint connections of front end wheel suspensions of motor vehicles.

An object of the invention is to provide an easily workable gage for checking the degree to which the ball joint connections of the front wheel control arm assemblies may be worn and indicate a need for replacement.

At the present time it is well known that many State motor vehicle laws require periodic inspections of licensed automobiles. In many instances one of the requirements for continued legal operation is that the ball joint connections of front wheel control arm assemblies be checked for excessive wear and the joints replaced if not found to be within certain limits of looseness or play. Further, the Automobile Manufacturers Association has developed certain standards of permitted tolerances to indicate when excessive wear at these joints indicates replacement is needed to avoid potential break down. These standards have been adopted in turn by some of the motor vehicle registration authorities.

As will be later explained in greater detail these ball joints must be checked for both axial and radial play. This is done by moving a wheel up and down to check axial play and rocking the wheel at the top or bottom to check radial play. Such testing is done while the wheel is freely suspended either by jacking the front end or by placing the vehicle on a car rack or lift. In either case, insofar as we are aware, prior methods used for detecting and measuring such axial and radial play have either been characterized by guesswork or by relatively elaborate and time consuming methods. In many cases the car owner who is told that replacement is necessary has no means of readily determining for himself that such is the case and he must blindly accept the word of the garage mechanic who is inspecting the car.

As indicated the tools heretofore used in checking axial and radial play, and particularly in the case of axial play, are cumbersome or combined with guesswork. Accordingly, it is an object of this invention to provide a tool which can be used with a minimum amount of time and effort to detect and measure the amount of axial and radial play in front wheel suspensions and to display for the car owner an easily readable and reliable indication of the degree of ball joint wear.

The above and other specific advantages and objects of the invention will be apparent from the following description thereof in connection with the accompanying drawings, in which, FIG. 1 is a schematic view showing one common type of control arm and spring suspension assembly for a front wheel with the tool of this invention positioned to check axial play;

FIG. 2 is a similar schematic view showing another type of suspension assembly, the tool being converted to mount the gage indicator for checking radial play;

FIG. 3 is an enlarged side elevational view of the gage shown by FIGS. 1 and 2 with the parts arranged in a nested storage position;

FIG. 4 is a side elevational view with the elements positionally arranged for checking axial play as in FIG. 1 and parts cut away to show details of the construction thereof;

FIG. 5 is a plan view of the tool as shown by FIG. 4;

FIG. 6 is a fragmentary view showing the gage mounted to detect radial play; and FIG. 7 is a detail view showing a modification of the wheel support element.

Referring to FIGS. 1 and 2 there are illustrated two general types of front ball joint suspensions for motor vehicle wheels. FIG. 1 illustrates the type in which a coil spring 2, or a torsion bar, is attached as to a lower control arm 4. FIG. 2 illustrates the general type in which a spring 2' is mounted on an upper control arm 6. As will be readily understood by those versed in the art the suspension of the wheel 8 in FIG. 1 above the ground level 10 must be accomplished by jacking the assembly under the lower arm 4 as indicated by arrow 12 in FIG. 1, and the suspension of the wheel 8' in FIG. 2 must be accomplished by jacking under the frame 14 as indicated by arrow 12' in FIG. 2. These two general types of suspensions apply to practically all cars. The manner of support at the location of the arrow indicates in each case the elevation of the front end and wheel so that the wheel is "unloaded" and in condition for manipulation to indicate play in the ball joint connections of the control arm linkage.

It will be appreciated by those skilled in the art that any noticeable movement or looseness in an upper joint 16 of the linkage shown by FIG. 1, and, any noticeable movement or looseness in the lower joint 18 of the linkage shown by FIG. 2, will indicate replacement is needed. The tool of the present invention is not needed for indicating play in joints 16 or 18. Such movement in these joints can be detected either by feel or observation merely by rocking at the top of the wheel 8 in the case of the joint 16, and rocking at the bottom of the wheel 8' in the case of the joint 18. Wear at these joints in any event is unusual since neither control arm 15 (FIG. 1) nor control arm 17 (FIG. 2) are spring loaded.

Referring in particular to FIG. 1, the tool is shown in position for raising the wheel to detect axial play and to determine whether the lower ball joint 20 needs replacing. A base or support plate 22 lies under the wheel with a lever 24 pivoted at its inner end as at 26. An upstanding support arm 28 is carried by lever 24 and engages the spindle 30 of the wheel 8 at its upper end. The lever 24 does not bear against the tire of the wheel and by manually lifting the lever handle 32, the spindle 30 and wheel 8 will be lifted but only if any looseness is present in the lower joint 20. Should any vertical or axial play be present in joint 20, the spindle 30 and link 34 will move upwardly and the amount of movement or play in the joint will be reflected by the reading on the dial of a gage unit 36. Should any reading exceed a specified tolerance, the joint needs replacing. On the other hand if the spindle 30 and link 34 cannot be manually lifted in this manner, this will indicate no wear in joint 20.

For the type of suspension shown by FIG. 1, the lower ball joint 20 also requires a check and measurement for radial play, if any. Replacement would be required if, for example, the amount of play exceeds one-quarter of an inch. For detecting and measuring radial play, the gage unit 36 is re-arranged on the base to contact the side wall of the tire, while the wheel is manually rocked back and forth at the bottom after the manner illustrated by FIG. 2. As there indicated the dial 36 is positioned to indicate any rocking movement of a wheel. Such rocking movement in the case of the wheel suspension shown by FIG. 1, will indicate the degree of radial play which may exist in the lower ball joint 20.

It will be seen in comparing the suspensions of FIGS. 1 and 2 that the rocking of the wheel in FIG. 2 will indicate looseness or play in the upper ball joint 19. Here, as in the case of the FIG. 1 suspension, if the amount of rocking movement exceeds one-quarter of an inch, for example, the upper ball joint 19 would need to be replaced. It will also be appreciated that if the tool is arranged as shown by FIG. 1, and then applied to check axial play of the suspension of FIG. 2, any looseness present in the upper ball joint 19 will be indicated. If the amount of play here were to exceed a specified tolerance, replacement of the upper joint 19 would be necessary. If the link at 21 cannot be manually lifted, no axial play is present in joint 18.

Referring now to FIG. 4 and FIG. 5 the base 22 of the tool is a rectangular plate. Lever 24 is pivoted at one end of the base on the pin at 26, the pin being mounted between spaced supports as the upstanding L-shaped brackets 38. The feet of the brackets are fixed to the plate 22 as by welding and the spaced legs extend above the pivot 26. The legs receive between them the upper end of the wheel support arm 28 in a collapsed storage position as shown by FIG. 3.

Lever 24 is horizontally disposed along the base and then upwardly directed at a convenient angle for manual operation by the handle at 32. Adjacent the other end of plate 22 and on the horizontal portion of lever 24, the wheel support or weight arm 28 of the tool is mounted. Preferably arm 28 is formed with an upstanding lower fixed section 40 rigidly mounted on lever 24 and a tubular upper hinged section 42 pivoted at the top of section 40. As shown, the fixed lower section comprises a pair of plates 44 formed by a U-shaped bracket welded on top of lever 24. A pin 46 is provided at the top between the plates 44, an upper tube 42 being pivoted for swinging movement on pin 46. Threaded in the tube and extending from the end thereof is a shaft extension 48, having at its outer end a semi-circular yoke or cradle 50 for engagement with the spindle housing of a wheel. Yoke 50 may be adjustably extended by turning shaft 48 in the tube 42 so as to fit snugly under the hub of a front wheel as in the operative position shown by FIG. 1. The yoke can also be swung on pin 46 to lie against the outer end of lever 24 when the tool is used for checking radial play as in FIG. 2, or, it may be swung to the collapsed storage position between brackets 38 as shown by FIG. 3.

The comparator gage 36, as shown by FIG. 4, is positioned to indicate axial play of a wheel by its mounting on a rest pin 52 extending from one of the plates 44 of the lower section 40 fixed on lever 24. The gage comprises a triangularly shaped plate, one side of which is formed with a lug 54 having a mounting socket for placing over rest pin 53. A wing lock screw 52 locks the gage in place.

Pivoted at the bottom of the plate 36 is a pointer 56 at each side of the plate, the tips of the pointers sweeping across calibrated indicia marks at 57 arranged on each side of the top of the plate. Spaced bell crank arms extend angularly from the lower ends of the pointers and between the outer end thereof is fixed a roller 58. Spaced inwardly of the roller and fixed between the short arms is a rod 60. A leaf spring 62 is anchored at the other side of the gage plate, its free outer end bearing against the rod to urge the pointers as to the right in FIG. 4 and in a direction for roller 58 to engage the top of a platform disk 64 mounted on plate 22.

The roller 58 of the gage contacts the upper surface of the disk 64 at an elevation determined by the adjustment of the disk on a threaded post 66 fixed on the base plate 22. Since the gage is rigidly mounted relative to its plate 44 and thus in fixed relation to lever arm 24, the disk 64 may be adjusted to swing the pointer against spring 62 to a zero reading when the lever 24 is in a lowermost rest position on the base plate 22. When once so set, the pointer will generally return to its zero reading when lever 24 is brought to rest position. However, because of casual handling which this type of tool generally receives and the fact that the gage may be taken off and replaced on the rest pin 52, the pointer may need periodic adjustment. The threaded engagement on post 66 thus provides a "fine" adjustment to shift the pointer to the zero reading whenever it is needed. The lowermost position of lever 24 relative to base plate 22 is fixed by the engagement of a foot at 70 at the underside of the lever below the plates 44.

The placement of the tool gage to detect and measure radical play in a wheel suspension as shown by FIG. 2 is best shown by FIG. 6. Here the base plate 22 underlies the tire elevated above ground level and the lug 54 has been mounted on the top of a post extension 72 adjustably fitted by the wing lock screw 74 in an upstanding tubular post 76 fixed on plate 22 laterally of the lever 24 and arm 28. The gage is horizontally disposed and the roller 58 engages the side wall of the tire at a position determined by the elevation of extension 72. The base plate 22 is moved under the tire to a position in which the roller 58 is urged against its spring 62 to register a zero reading by the pointers at the center of the dial. The bulk and weight of the tool is sufficient to maintain the base firmly in place while the wheel is manually rocked either at the top or the bottom. In the event of any play the pointer will register the amount at either side of the zero marking and indicate whether the ball joint is worn.

A modification of the means for extending the outer shaft 48 of the wheel support arm 38 as shown by FIG. 4 is illustrated by FIG. 7. Here in place of the threaded engagement between shaft 48 and tube 42 is a one way clutch arrangement. Shaft 48' is slidable in tube 42'. An angled steel strap 80 is anchored on the upper end of the tube with its free end 82 apertured to receive shaft 48'. A steel latch piece 84 is caught at its inner edge in the angle of strap 80 and is apertured to receive the shaft 48', a coil spring 86 being wrapped around the shaft between the free end 82 and piece 84 to urge the latter into a canted gripping position on shaft 48'. Thus the shaft 48' may be frictionally drawn outwardly and locked in position against inner travel for supporting a wheel as in FIG. 1. By pressing piece 84 against the spring the shaft 48' may be released for sliding into tube 42'.

What is claimed is:

1. In a device for checking the ball joints of a motor vehicle front end wheel suspension, a base, a lever of the second order fulcrummed on the base, an upstanding weight arm mounted on and carried by said lever in spaced relation to said fulcrum and having vehicle wheel engaging means at its outer end, said lever and base having interengageable surfaces supporting the lever at its lower limit of movement adjacent the connection of said weight arm to said lever, and a comparator gage unit carried in fixed relation to said lever and having a yieldable actuating member engaging said base and registering the distance by which said interengageable surfaces are separated in manually raising said lever when a vehicle wheel is engaged by said weight arm and the ball joint connections permit displacement thereof.

2. In apparatus for checking the ball joint connections of a motor vehicle front end wheel suspension, a supporting base, a wheel lifting device having a lever with a pivotal mounting at one end of the base, an upstanding wheel supporting arm carried by the lever in spaced relation to the pivotal mounting thereof and having means for engaging the wheel at the upper end of the arm, a comparator gage unit carried by said lever having an indicator actuating member yieldably urged towards said base and said base having a member engageable by said actuating member, one of said members being adjustable for setting said gage unit whereby the amount a wheel is lifted by said lifting device is reflected by said gage unit.

3. In apparatus for checking the ball joint connections of a motor vehicle front end wheel suspension, a base, a wheel lifting device having a lever pivoted at one end of the base, a wheel support arm mounted on the lever in spaced relation to said pivot having a short upstanding section rigid with said lever and an upper section having an adjustable extension carrying at its outer end a yoke engageable to support the wheel, said upper section being pivotally mounted on said lower section, a comparator gage unit mounted on said inner arm section and having an indicator actuating arm yielding urged in the direction of said base, a platform member mounted on the base and engaging said gage actuating arm of the gage, said platform member having means for adjusting the elevation thereof with respect to said base.

4. The structure of claim 3 in which said upper section of the wheel support arm is a cylindrical member and the adjustable extension thereof has a threaded engagement therein and said yoke is formed to engage the hub of vehicle wheel.

5. The structure of claim 3 in which said upper section of the wheel support is a cylindrical tube and the extension thereof is slidably engaged therein with a spring urged latch means fixed at the outer end of the tube for releasably gripping said extension against inward movement.

6. In apparatus for checking the ball joint connections of a motor vehicle front end wheel suspension, a rectangular base having at one end a pair of short upstanding posts, a lever pivoted at one end between said posts and extending horizontally along the base and extending therebeyond at an upward angle with a handle at the free end thereof, a wheel support arm fixed on the lever adjacent the other end of the base comprising a pair of short upstanding members, a cylindrical tube section pivoted therebetween and an adjustable extension telescopically carried by the tube with a wheel engaging yoke at the outer end, the said tube being swingable between the said angled portion and pivoted inner end portion of said lever, a gage unit removably fixed on one of said support arm posts and having an actuator arm yieldably urged in the direction of said base, and a platform disk threaded on a post fixed to said base and receiving said yieldably urged actuator arm, said platform disk being adjustable relative to said base for raising and lowering the same for setting the indicator of said gage when said lever is at its lowermost seated position on said base.

References Cited by the Examiner

UNITED STATES PATENTS

| | | | |
|---|---|---|---|
| 2,589,770 | 3/1952 | Bullinger | 33—169 |
| 2,623,296 | 12/1952 | Bagge et al. | 33—203.19 X |
| 2,717,450 | 9/1955 | Pickering | 33—203.15 X |
| 3,124,881 | 3/1964 | Butler | 33—203 X |
| 3,181,245 | 5/1965 | Bullinger | 33—203.15 X |

ISAAC LISANN, *Primary Examiner.*